Patented Jan. 28, 1936

2,028,758

UNITED STATES PATENT OFFICE 2,028,758

VARNISH COMPOSITION

Joseph B. Dietz, Lansdowne, and Edmund F. Oeffinger, Philadelphia, Pa., assignors to E. I. du Pont de Nemours & Company, Wilmington, Del., a corporation of Delaware No Drawing. Application February 19, 1932, Serial No. 594,142

10 Claims. (Cl. 134—26)

This invention relates to a process of preparing varnish, and to a new varnish composition, and more particularly, relates to the use of Batu gum in varnishes.

Batu gum, also known as Galla-Galla gum, belongs to the Damar family and is largely obtained from Borneo. The gum is brownish in color, quite hard and tough, and presents a stratified appearance due to the presence of layers of waxy material distributed through it. Heretofore, it has been used to some extent in the manufacture of linoleum, where it is used, not as an ingredient of a coating composition, but as a binding material in the linoleum base itself. Although its use in varnishes has been suggested, such use has been practically negligible because it is almost impossible to satisfactorily incorporate this gum with other ingredients used in varnish manufacture according to the usual procedure, the resulting varnish generally giving films which are not clear and which have a streaky appearance on drying, or in some cases, giving films which do not dry within a reasonable length of time regardless of the kind or amount of drier used. The difficulty in using this gum appears to be due to its wax content. For these reasons, although the gum is exceedingly cheap, it has never been used in any substantial amounts in the manufacture of varnish.

An object of the present invention is the preparation of a satisfactory varnish using Batu gum. A further object is the preparation of such a varnish which will give a non-streaky film on drying. A still further object is to provide such a varnish which will dry at a rate favorably comparable with varnishes now commonly used and employing far more expensive gums or resins.

These objects are accomplished according to the present invention by heating Batu gum with a relatively small amount of a semi-drying or drying oil to a temperature of about 450–490° F., preferably with the addition of limed rosin, or other resinous material, which will serve to flux the Batu gum, and then thinning the mixture with a varnish thinner.

The following example is given to illustrate the preparation of varnish according to the present invention; the parts are given by weight.

*Example 1. Non-pigmented varnish.*—34 parts of Batu gum, 4 parts of limed rosin, and 2 parts of Chinawood oil are heated to 460° F. and held at that temperature for 10 minutes. The mixture before it is allowed to cool down appreciably is then thinned with a varnish thinner consisting of 17 parts of turpentine substitute and 43 parts of benzine. The resulting varnish gives a flat finish without the necessity of incorporating flatting agents and is highly satisfactory as to drying and other properties.

It will be understood that the above example is given merely to illustrate the invention and that the process may be varied considerably without departing from the scope of the invention.

The proportions of ingredients may be varied as follows:

| | Parts |
|---|---|
| Batu gum | 20–40 |
| Limed rosin | 0–20 |
| Chinawood oil | 2–8 |

Limed rosin may be eliminated entirely, although this is not preferred, as the presence of the limed rosin adds appreciably to the compatibility of the varnish and the uniform appearance of films made from the varnish. By the term "limed rosin" is meant rosin which has been heated with 2–7% of lime which, as is well known in the art, reacts with the abietic acid in the rosin. In place of limed rosin, other resinous materials which will serve to flux the Batu gum may be used. For example, limed fossil gums, or ester gum, may be used, and also ordinary rosin or the other resinous materials mentioned may be employed without lime, the use of such resinous materials without lime resulting in a varnish which gives softer films than would be obtained with a varnish employing limed rosin. For most uses the softer film is not as advantageous and, consequently, it is preferred to use limed rosin.

It is preferred to employ Chinawood oil, but other drying and semi-drying oils, such as linseed oil, soya bean oil, fish oil, and the like, may be used, although it will be appreciated that where a semi-drying oil is used the drying properties of the varnish are not as good as where an oil such as Chinawood oil is employed.

The heat treatment of the mixture of Batu gum, limed rosin, and Chinawood oil need not necessarily be carried out at exactly 460° F., but may be carried out at a temperature from 450–490° F. and the time of heating may be varied from about 5–20 minutes, it being necessary, of course, to prolong the heat treatment sufficiently to get a compatible mixture of the ingredients. In order to facilitate the solution of the heated mixture in a varnish thinner, it is preferred to thin the mixture before allowing the temperature to drop appreciably, although it may be thinned after cooling down somewhat by stirring the mixture with the varnish thinner for a considerable period of time. The varnish thinner given in the example, namely, turpentine substitute and benzine, may be in any proportion, that is, either one of the two ingredients may be eliminated, and furthermore, other usual varnish thinners may be employed.

If desired, varnish driers, flatting agents, and pigments may be added to this composition in the usual manner in which such ingredients are incorporated in varnish. However, a highly satisfactory flat, non-pigmented varnish may be obtained without the use of flatting agents.

Varnishes made according to the present invention are very economical and are favorably comparable with varnishes using the most expensive gums. The difficulty heretofore encountered with the use of Batu gum in varnishes is completely overcome, that is, the varnish of the present invention dries at a satisfactory rate and films from the varnish of the present invention do not show the objectionable stratification generally characteristic of films made from varnishes in which Batu gum had been incorporated according to ordinary varnish procedure.

As many apparently widely different embodiments of this invention may be made without departing from the spirit and scope thereof, it is to be understood that the invention is not limited to the specific embodiments thereof except as defined in the appended claims.

We claim:

1. Process of preparing a varnish comprising heating a mixture comprising 20-40 parts of Batu gum, 0-20 parts of a resinous material from the group consisting of rosin, fossil gums and ester gum, and 2-8 parts of an oil from the group consisting of semi-drying and drying oils, at a temperature of 450-490° F., and then thinning said mixture with a varnish thinner.

2. Process of preparing a varnish comprising heating a mixture comprising Batu gum, limed rosin, and a relatively small amount of an oil from the group consisting of semi-drying and drying oils, at a temperature of 450-490° F., and then thinning said mixture with a varnish thinner.

3. Process of preparing a varnish comprising heating a mixture comprising Batu gum, limed rosin, and a relatively small amount of Chinawood oil, at a temperature of 450-490° F., and then thinning said mixture with a varnish thinner.

4. Process of preparing a varnish comprising heating a mixture comprising 20-40 parts of Batu gum, 0-20 parts of limed rosin, and 2-8 parts of an oil from the group consisting of semi-drying and drying oils, at a temperature of 450-490° F. for 5-20 minutes, and then thinning said mixture with a varnish thinner.

5. Process of preparing varnish comprising heating a mixture comprising 20-40 parts of Batu gum, 0-20 parts of limed rosin, and 2-8 parts of Chinawood oil, at a temperature of 450-490° F. for 5-20 minutes, and then thinning said mixture with a varnish thinner.

6. Process of preparing a varnish comprising heating a mixture comprising 20-40 parts of Batu gum, 4 parts of limed rosin, and 2-8 parts of an oil from the group consisting of semi-drying and drying oils, at a temperature of 450-490° F. for 5-20 minutes, and then thinning said mixture with a varnish thinner.

7. Process of preparing a varnish comprising heating a mixture comprising 20-40 parts of Batu gum, 4 parts of limed rosin, and 2-8 parts of Chinawood oil, at a temperature of 450-490° F. for 5-20 minutes, and then thinning said mixture with a varnish thinner.

8. Process of preparing a varnish comprising heating a mixture of approximately 34 parts of Batu gum, 4 parts of limed rosin, and 2 parts of Chinawood oil, at a temperature of about 460° F. for about 10 minutes, and then thinning said mixture with a varnish thinner.

9. A varnish comprising a mixture obtained by heating 20-40 parts of Batu gum, about 4 parts of limed rosin, and 2-8 parts of an oil from the group consisting of semi-drying and drying oils, to a temperature of 450-490° F., said mixture being dissolved in a varnish thinner.

10. A varnish comprising a mixture obtained by heating 20-40 parts of Batu gum, about 4 parts of limed rosin, and 2-8 parts of Chinawood oil, to a temperature of 450-490° F., said mixture being dissolved in a varnish thinner.

EDMUND F. OEFFINGER.
JOSEPH B. DIETZ.